US006898833B2

(12) United States Patent
Ashton

(10) Patent No.: US 6,898,833 B2
(45) Date of Patent: May 31, 2005

(54) BY-PASS CONVEYOR

(75) Inventor: Stephen Richard Ashton, Essex (GB)

(73) Assignee: Ashton Industrial Sales Limited, Woodford Green (GB)

( * ) Notice: Subject to any disclaimer, the term of this patent is extended or adjusted under 35 U.S.C. 154(b) by 123 days.

(21) Appl. No.: 10/319,453

(22) Filed: Dec. 13, 2002

(65) Prior Publication Data

US 2003/0146066 A1 Aug. 7, 2003

(30) Foreign Application Priority Data

Dec. 13, 2001 (GB) .............................................. 0129759

(51) Int. Cl.[7] .......................... B21B 15/00; B23P 19/00
(52) U.S. Cl. ............................ 29/33 P; 29/700; 29/822
(58) Field of Search ........................ 29/700, 33 P, 822; 198/346.2, 346

(56) References Cited

U.S. PATENT DOCUMENTS 5,209,627 A * 5/1993 Lisec .......................... 414/398

FOREIGN PATENT DOCUMENTS

JP          2001 315960         11/2001

* cited by examiner

Primary Examiner—John C. Hong
(74) Attorney, Agent, or Firm—Heslin Rothenberg Farley & Mesiti P.C.; Victor A. Cardona, Esq.

(57) ABSTRACT

The present invention relates to an apparatus for removing articles from a continuous manufacturing line without interrupting the line comprising a pair of conveyor portions arranged in substantially parallel alignment, each having means for transporting an article along the manufacturing line and being mounted on a frame, the frame being reversibly transportable between a first and second position in a direction substantially orthogonal to the direction of travel of an article on the manufacturing line, said first and second positions corresponding with a conveyor portion being in alignment with the continuous manufacturing line.

18 Claims, 2 Drawing Sheets

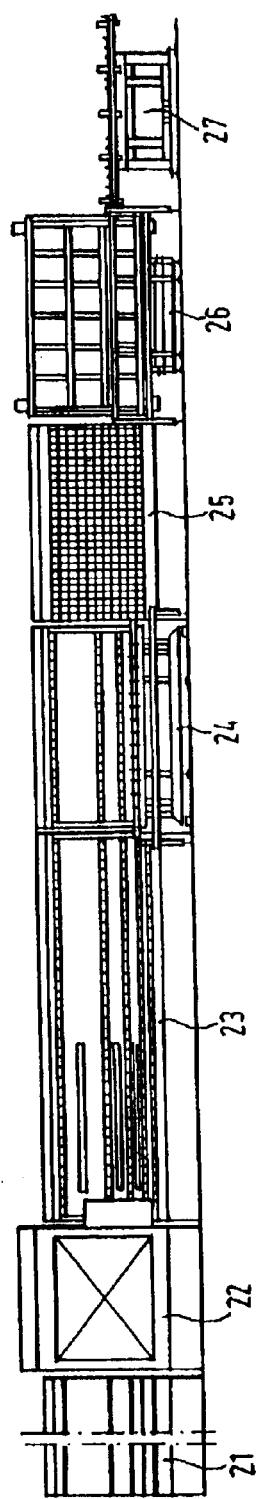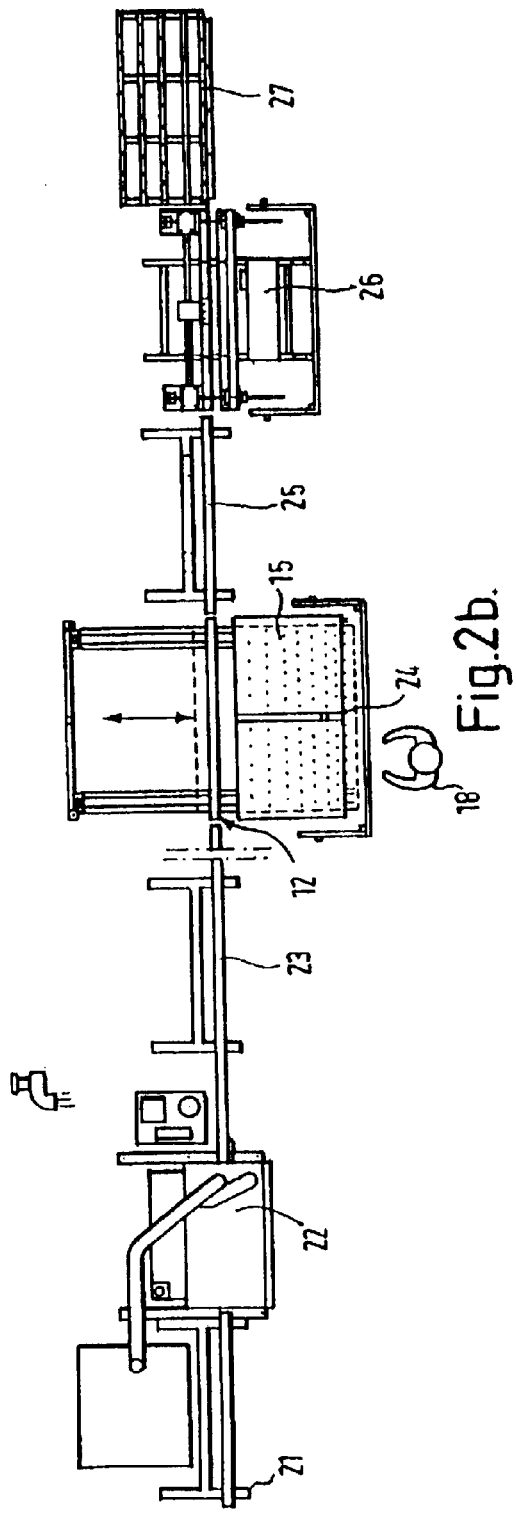
Fig.2a.
Fig.2b.

BY-PASS CONVEYOR

Cross Reference to Related Applications

This application claims priority from United Kingdom patent application number 01 29759.7, filed on Dec. 13, 2001, the entire disclosure of which is incorporated herein by reference.

The present invention relates to apparatus and a method for manufacturing insulated glass units used, for example, in double or triple glazing, in particular the invention is directed towards an apparatus and method for applying spacer frames to glass sheet during the manufacture of the said insulated glass units.

The present method of applying spacer frames to glass sheet during the manufacture of the said insulated glass units require a glass sheet to be conveyed by vertical transport conveyor to an application table which in a first position is in alignment with the vertical transport conveyor. The application table is then tilted to the horizontal for application of a spacer frame manually. The table is then raised again and the glass sheet with spacer frame conveyed off to an assembly and pressing station. Where double glazing units are being manufactured, the glass sheet which comprises the second glass of the pair of glass sheets has to enter the application table and exit before the first glass of the next pair of glass sheets can enter for application of a spacer frame.

A considerable amount of production time is lost as an operator has to wait for every other glass sheet to pass through the application table before being able to tilt the application table to the horizontal for application of a spacer frame to the second glass of each pair of glass sheets.

The present invention seeks to provide an apparatus and a method for manufacturing insulated glass units which overcomes the disadvantages of the prior art.

SUMMARY OF THE INVENTION

In a first aspect of the invention, an apparatus is provided for removing articles from a continuous manufacturing line without interrupting the line comprising a pair of conveyor portions arranged in substantially parallel alignment, each having means for transporting an article along the manufacturing line and being mounted on a frame, the frame being reversibly transportable between a first and second position in a direction substantially orthogonal to the direction of travel of an article on the manufacturing line, said first and second positions corresponding with a conveyor portion being in alignment with the continuous manufacturing line. Optionally, the manufacturing line can comprise at least one vertical transport conveyor.

Articles can include glass sheet used, for example, for the manufacture of insulating glass units such as double or triple glazed units.

One of the conveyor portions can comprise an application table and/or a vertical transport conveyor or part thereof. The frame can, in particular, slide along tracks provided beneath the manufacturing line. In addition or alternatively, the frame is a wheeled trolley.

One particular aspect of the invention is the provision of an apparatus wherein the application table is reversibly tiltable, preferably to the horizontal. Additionally, the application table can comprise an air flotation device permitting a glass sheet to be freely manoeuvred and rotated on the application table when horizontal. The air flotation device can be coated in rubber. Desirably, the air flow through the air flotation device can be reversed during application of a spacer frame in order to hold a glass sheet firmly to the device. Furthermore, the application table is preferably supported by at least one pneumatic or hydraulic cylinder for lifting the air flotation device permitting a glass sheet to be freely manoeuvred and rotated on the application table when horizontal without obstruction.

In another aspect of the invention, an insulating glass unit production line is provided comprising an apparatus as hereinbefore described.

In a further aspect of the invention, a method of removing articles from a continuous manufacturing line without interrupting the line is provided which comprises the steps of removing a section of the line with the article to be removed; and replacing the missing section with a separate section of line to complete the manufacturing line once more.

Yet another aspect of the invention is a method of applying spacer frames during manufacture of insulating glass units comprising the steps of locating a glass sheet on an application table orientated substantially vertically in a first position; reversibly tilting the application table to a second horizontal position whilst simultaneously moving the table forward to an application position; reversibly sliding a vertical transport conveyor for conveying glass sheet to the position vacated by the application table; applying a spacer frame to the glass sheet located on the application table whilst substantially simultaneously conveying glass sheet past the application table using the vertical transport conveyor; sliding the application table back to the first position simultaneously sliding the vertical transport conveyor away; conveying the glass sheet with a spacer frame off the application table and conveying another glass sheet onto the application table for application of a spacer frame.

The final aspect of the present invention is the provision of a method of manufacturing insulated glass units comprising the steps of locating a glass sheet on an application table orientated substantially vertically in a first position; reversibly tilting the application table to a second position whilst simultaneously moving the table forward to an application position; reversibly sliding a vertical transport conveyor for conveying glass sheet to the position vacated by the application table; applying a spacer frame to the glass sheet located on the application table whilst conveying glass sheet past the application table using the vertical transport conveyor; sliding and tilting the application table back to the first position simultaneously sliding the vertical transport conveyor away; conveying the glass sheet with a spacer frame off the application table and conveying another glass sheet onto the application table for application of a spacer frame.

BRIEF DESCRIPTION OF THE DRAWINGS

For the purposes of exemplification, some embodiments of the main aspect of the invention are now described with reference to the following Figures in which:

FIGS. 2a–2b show a front and vertical view respectively of a first embodiment of an insulating glass unit production line comprising the application table apparatus of the invention.

DETAILED DESCRIPTION OF EMBODIMENTS

Figure 1A:
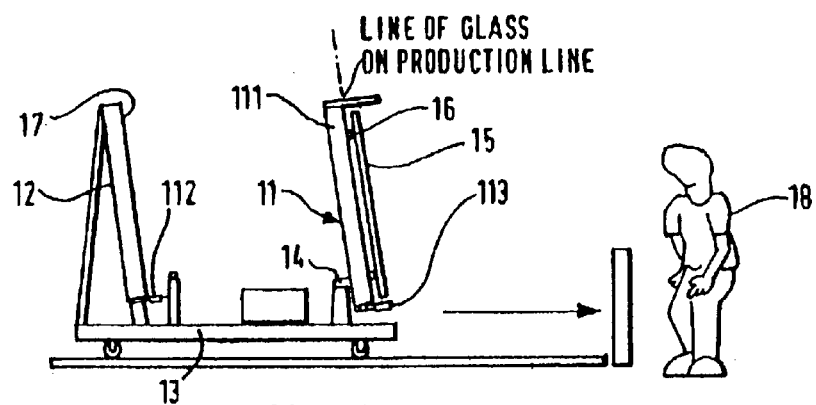
FIGS. 1a–1c show side views of a first embodiment of an application table apparatus in use.

FIG. 1a shows a first embodiment of an application table apparatus comprising an application table (11) in substantially vertical alignment with a glass production line as indicated by the dashed line. The apparatus further comprises a vertical transport conveyor (12) aligned with the application table. Both the application table (11) and the vertical transport conveyor (12) are mounted on a wheeled trolley (13) which reversibly slides the application table (11) out of and into alignment with the glass production line simultaneously reversibly sliding the vertical transport conveyor (12) into and out of alignment with the glass production line.

The application table (11) comprises a pivot (14) near one edge of the table (11) permitting the table (11) to tilt to the horizontal. The tilting action is controlled by a heavy duty brake motor and reduction gearbox (not shown). The application table (11) further comprises a rigid metal frame (111) supporting an air flotation device (15) of medium density fibre board coated in Neoprene™ rubber mounted on four heavy duty pneumatic cylinders (16).

The vertical transport conveyor (12) comprises individual driven shafts in dual bearings (not shown) located at the base of the conveyor each carrying a cut-resistant polyurethane roller (112) for supporting and conveying glass sheet. Glass sheet is further supported by provision of air flotation through the back board (17) of the conveyor. Glass sheet is supported and conveyed by the application table (11) in a similar manner when in a substantially vertical alignment.

Figure 1B:
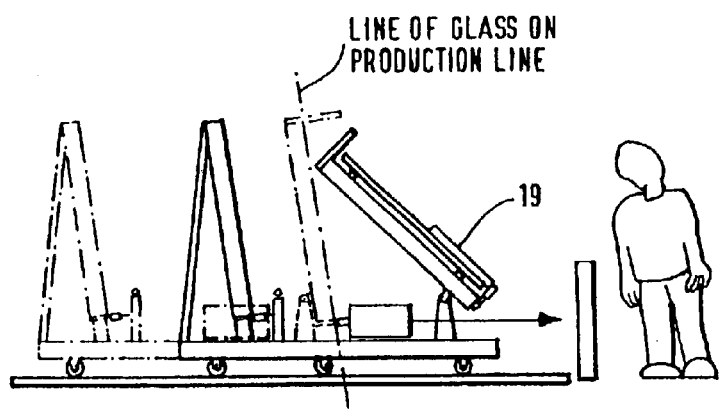
Figure 1C:
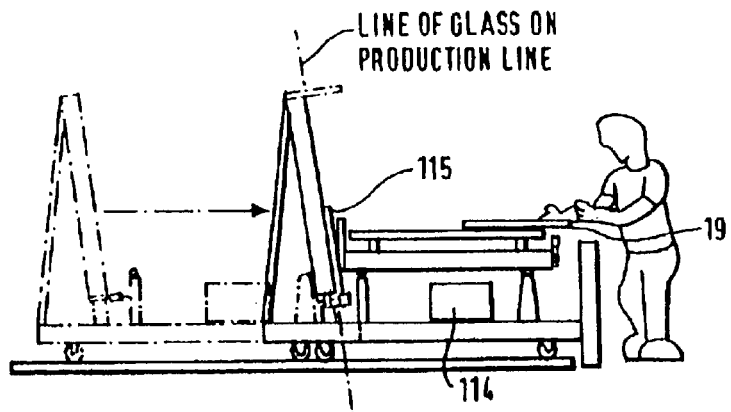

The method of use of the application table apparatus is shown in the series of FIGS. 1a to 1c. In FIG. 1a, the application table apparatus can be seen with the application table (11) in alignment with the glass production line indicated by the dashed line. As shown in FIG. 1b, when a glass sheet (19) is conveyed onto the application table (11), proximity switches and optical sensors (not shown) detect the presence of the glass sheet on the application table (11) and the application table (11) is automatically tilted to the horizontal and the wheeled trolley (13) simultaneously slid towards the operator (18). FIG. 1c shows the wheeled trolley (13) slid fully towards the operator (18), the vertical transport conveyor (12) now in alignment with the glass production line indicated by the dashed line. With the application table (11) fully in the horizontal position, the pneumatic cylinders (16) lift the flotation device (15) clear of the application table polyurethane rollers (113) allowing the glass sheet (19) to be freely manoeuvred and rotated on the application table (11). A fan (114) which provides the means for flotation can also be switched to suck air through the flotation device (15) and hold the glass sheet (19) in position while the operator (18) manually fits a spacer frame thereto.

Whilst the operator is fitting a spacer frame to the glass sheet (19), the second glass sheet (115) of the pair of glass sheets (19, 115) which together comprise a double glazed unit can pass behind the application table (11) on the vertical transport conveyor (12). When the operator (18) has fitted the spacer frame to the first glass sheet (19) of the aforementioned pair of glass sheets (19, 115), the operator (18) can depress a foot pedal sending the application table (11) back to its vertical in-line position supplanting the vertical transport conveyor which simultaneously slides back on the wheeled trolley (13). The first glass sheet (19) complete with spacer frame is then conveyed to the assembly and pressing station following the second glass sheet (115). The first glass sheet of the next pair of glass sheets comprising the next double glazed unit can then be conveyed onto the application table (11).

FIGS. 2a and 2b illustrate an insulating glass unit production line comprising the application table apparatus hereinbefore described. Looking down the production line, the line comprises a non-driven vertical run-in conveyor (21), a washing and drying station (22), a combined vertical inspection and acceleration conveyor (23), the application table apparatus hereinbefore described (24), a vertical driven conveyor with a grille alignment board (25), a combined assembly and pressing station (26) and an automatic tilt table with vertical drive and horizontal rising castor pallet (27).

In operation, an operator loads the non-driven vertical run-in conveyor (21) with a glass sheet and pushes the leading edge of the glass sheet into the washing and drying station (22) whereupon a drive in the washing and drying station (22) transports the glass sheet into the station. The glass sheet then exits the washing and drying station (22) onto the combined vertical inspection and acceleration conveyor (23) assuming it is not already occupied in which case the glass sheet waits within the washing and drying station (22) until a sensor indicates it is free to proceed. The combined vertical inspection and acceleration conveyor (23) automatically queues glass sheet if the following stations are full.

The first glass sheet of a pair comprising a double glazed unit is conveyed onto the application table (11) when it is free and in vertical alignment whereupon the application table (11) automatically tilts to the horizontal as hereinbefore described. Whilst the operator (18) manually fits a spacer frame to the first glass sheet, the second glass sheet is conveyed to the next station, the vertical driven conveyor with a grille alignment board (25), by the vertical transport conveyor (12). After the operator (18) has fitted the spacer frame to the first glass sheet, the application table (11) is tilted back to the vertical in-line position and the glass sheet with spacer frame automatically passes on to the next station following the second glass sheet.

The station following the application table apparatus (24) serves for optionally manually applying grilles. Each glass sheet remains at this station until a foot pedal is operated permitting them to proceed onto the combined assembly and pressing station (26). When the second glass sheet (without attached spacer frame) is conveyed into the combined assembly and pressing station (26) which comprises a vertical driven conveyor, the glass sheet is positioned against a retractable longitudinal stop. Mounted at the front of the station is a vacuum sucker matrix set into the surface of a pressing plate which advances to the surface of the glass sheet attaching itself thereto and then reverses lifting the glass sheet off the vertical driven conveyor. At that same time, a signal is given indicating that the vertical driven conveyor is vacant and the first glass sheet with attached spacer frame is conveyed to the said retractable longitudinal stop.

The press plate carrying the second glass sheet (without attached spacer frame) then advances once more precisely positioning the second glass sheet over the first. The unpressed total thickness of the assembled unit is sensed and the press plate advanced a further preset distance to optimally press the unit. Where triple glazed units are being manufactured, the press plate automatically lifts the pressed double unit and assembles and presses it onto a third glass sheet in the same manner.

After the assembled unit is released from the press plate, the unit is conveyed to the automatic tilt table with vertical drive and horizontal rising castor pallet (27). If the tilt table (27) is already occupied or not otherwise in its vertical position, the unit will remain in the combined assembly and pressing station (26) until a signal is given to proceed along the production line. As the trailing edge of the unit accelerates out of the combined assembly and pressing station (26), the next glass sheet is allowed to enter.

When the assembled unit is fully on the tilt table (27), sensors signal the table to tilt to the horizontal plane. The tilt table (27) comprises a rigid metal frame supporting all-directional Nylon™ castor balls mounted on four heavy duty pneumatic cylinders. Once the tilt table has reached its full horizontal position, the four pneumatic cylinders raise the assembled unit clear of the polyurethane transport rollers in a similar manner as described hereinbefore for the application table (11). The assembled unit can then be easily pulled across to a variable height pneumatically lifting sealing table (not shown).

In another embodiment, the tilt table (27) is not used in tilt mode and the assembled units lifted vertically off the vertical conveyor for later sealing.

It is to be understood that the foregoing is merely exemplary of embodiments of the present invention and that modifications can be made without departing from the true scope of the present invention as defined in the accompanying claims.

What is claimed is:

1. An apparatus for removing and replacing articles from a continuous manufacturing line without interrupting the line comprising a pair of conveyor portions arranged in substantially parallel alignment relative to a longitudinal direction of the manufacturing line, each conveyor portion of the pair of conveyor portions having means for transporting an article along the manufacturing line and being mounted on a frame, the frame being reversibly transportable between a first position and a second position in a direction substantially orthogonal to the direction of travel of an article on the manufacturing line, wherein the first position comprises one of the conveyor portions of the pair of conveyor portions being in alignment with the continuous manufacturing line, and the second position comprises the other of the conveyor portions of the pair of conveyor portions being in alignment with the continuous manufacturing line, thereby to facilitate removal and replacement of articles from said continuous manufacturing line without interrupting the line.

2. An apparatus according to claim 1 wherein the manufacturing line comprises at least one vertical transport conveyor.

3. An apparatus according to claim 2 wherein the article is a glass sheet.

4. An apparatus according to claim 2 wherein the manufacturing line is for the manufacture of insulating glass units.

5. An apparatus according to claim 1 wherein the article is a glass sheet.

6. An apparatus according to claim 1 wherein the manufacturing line is for the manufacture of insulating glass units.

7. An apparatus according to claim 1 wherein said one conveyor portions of the pair of conveyor portions comprises an application table.

8. An apparatus according to claim 7 wherein the application table is reversibly tiltable.

9. An apparatus according to claim 8 wherein the application table is reversibly tiltable to the horizontal.

10. An apparatus according to claim 9 wherein the application table comprises an air flotation device permitting a glass sheet to be freely maneuvered and rotated on the application table when horizontal.

11. An apparatus according to claim 10 wherein the air flotation device is coated in rubber.

12. An apparatus according to claims 10 wherein the air flotation device can hold a glass sheet by reversing the air flow during application of a spacer frame.

13. An apparatus according to any one of claims 10 wherein the application table is supported by at least one pneumatic or hydraulic cylinder for lifting the air flotation device permitting a glass sheet to be freely maneuvered and rotated on the application table when horizontal without obstruction.

14. An apparatus according to claim 1 wherein the other conveyor portion of the pair of conveyor portions is a vertical transport conveyor or a part of a vertical transport conveyor.

15. An apparatus according to claim 1 wherein the frame is slideable along tracks provided beneath the manufacturing line.

16. An apparatus according to claim 1 wherein the frame is a wheeled trolley.

17. An insulating glass unit production line comprising an apparatus according to claim 1.

18. An apparatus for removing articles from a continuous manufacturing line without interrupting the line comprising a pair of vertical conveyor portions arranged in substantially parallel alignment, each of said pair of vertical conveyor portions having means for transporting an article along the manufacturing line and being mounted on a frame, the frame being reversibly transportable between a first and a second position in a direction substantially orthogonal to the direction of travel of an article on the manufacturing line, wherein one of the pair of vertical conveyor portions comprises an application table that is reversibly tiltable between a vertical position, in which the application table is in vertical alignment with tho continuous manufacturing line in the first position of the frame, and a horizontal position in the second position of the frame, whereby the movement of the frame from the first position to the second position further causes the other of the vertical conveyor portions to move into alignment with the continuous manufacturing line.

* * * * *